United States Patent [19]

Plummer

[11] Patent Number: 4,707,063

[45] Date of Patent: Nov. 17, 1987

[54] WIDELY SPACED FIBER OPTIC CONNECTOR AND MULTIPLEXER/DEMULTIPLEXER USING SAME

[75] Inventor: William T. Plummer, Concord, Mass.

[73] Assignee: Polaroid Corporation, Cambridge, Mass.

[21] Appl. No.: 804,522

[22] Filed: Dec. 4, 1985

Related U.S. Application Data

[63] Continuation of Ser. No. 576,490, Feb. 2, 1984.

[51] Int. Cl.[4] .......................... G02B 6/32; G02B 6/36; H04B 9/00
[52] U.S. Cl. ................. 350/96.18; 350/96.20; 350/96.21; 350/96.15; 370/3
[58] Field of Search ............... 350/96.10, 96.15, 96.16, 350/96.18, 96.20, 96.21, 96.22, 96.28, 415; 370/1, 3

[56] References Cited

U.S. PATENT DOCUMENTS

| | | | |
|---|---|---|---|
| 4,157,216 | 6/1979 | Plummer | 128/6 |
| 4,183,618 | 1/1980 | Rush et al. | 350/96.18 |
| 4,186,995 | 2/1980 | Schumacher | 350/96.20 |
| 4,196,990 | 4/1980 | Forsyth | 128/6 |
| 4,382,656 | 5/1983 | Gilby | 350/96.28 |
| 4,420,219 | 12/1983 | Muchel | 350/96.18 |
| 4,421,383 | 12/1983 | Carlsen | 350/96.21 |
| 4,563,057 | 1/1986 | Ludman et al. | 350/96.18 |

FOREIGN PATENT DOCUMENTS

| | | |
|---|---|---|
| 0032722 | 7/1981 | European Pat. Off. . |
| 0035054 | 9/1981 | European Pat. Off. . |
| 0036626 | 9/1981 | European Pat. Off. . |
| 1429843 | 3/1976 | United Kingdom . |

OTHER PUBLICATIONS

Jacobs, "Fundamentals of Optical Engineering" chapt. III, Theory of Stops, McGraw-Hill (1943), pp. 48–57.
Thomas, "SPSE Handbook of Photographic Science and Engineering" J. Wiley and Sons, 1973, p. 253.

*Primary Examiner*—William L. Sikes
*Assistant Examiner*—Brian M. Healy
*Attorney, Agent, or Firm*—Francis J. Caufield

[57] ABSTRACT

An imaging component of unitary construction, molded of a transparent optical plastic, and adapted for use with a companion, preferably similar, component to optically couple optical fibers with one another. The component includes a lens surface arranged about an optical axis therethrough, a reference surface for facilitating mounting and positioning the component, and structure for facilitating receiving and positioning the end of an optical fiber at a fixed distance along the optical axis and behind the focus of the lens surface. The optical structure of the component is such that, when used with another axially spaced by a fixed distance and operating at finite conjugates as a pair, the optical fiber end in each is exactly imaged onto or within the entrance pupil of the other. This permits the axial separation between the two components to be substantially greater than the focal length of their lens surfaces so that, among other things, other components such beam-splitters can be introduced between the pair to perform multiplexing functions.

14 Claims, 9 Drawing Figures

WIDELY SPACED FIBER OPTIC CONNECTOR AND MULTIPLEXER/DEMULTIPLEXER USING SAME

This is a continuation of application Ser. No. 576,490, filed Feb. 2, 1984.

BACKGROUND OF THE INVENTION

This invention in general relates to fiber optic communication systems and in particular to the structure of components for coupling two or more optical fibers which individually can carry information signals in the form of one or more modulated electomagnetic waves of preassigned wavelength.

Optical fibers have become and will continue developing as an extremely attractive transmission medium for use in the communication industry primarily because of their ability to carry hundreds of times more information than other more conventional media of equivalent size. Paradoxically, the reason which makes optical fibers so attractive also accounts for many of the obstacles to their practical use in large scale communication systems in which their capacities can be fully exploited. For unlike copper wire connectors requiring only a reliable physical contact, optical fibers of hairlike size wherever coupled in a system with other larger components or other fibers require a great deal of precision and the consequence of poor coupling is inherently large signal or information loss.

There are many instances in a system where coupling errors can arise. For example, multiple access requires tapping a single fiber optic link with couplers that are easy to use in the field. Also, combining modulated signals from multiple light sources into a single fiber to increase effective data rates and to permit communication between a number of stations requires couplers in the form of adequate multiplexer/demultiplexers.

To solve some of these coupling problems with tolerable losses, those skilled in the art have developed a class of connectors sometimes referred to as expanded-beam or imaging type connectors of the sort described in, for example, U.S. Pat. Nos. 4,183,618 and 4,186,995 and in an article entitled, "Connectors That Stretch" appearing in the October, 1980 issue of *Optical Spectra.*

The essence of the expanded-beam type connector is to use two similar connector halves performing like and reversible optical functions. One is used to enlarge and collimate or roughly collimate radiation emerging from a source fiber (or fibers) accurately placed in one half of the connector at the focus of a lens thereof. The other connector half similar in design to the first half, but which may in fact be scaled to be larger, accepts the expanded beam from the first connector half and focuses it into a receiving fiber end located at its axial focus. With this arrangement, the task of optical alignment becomes one of mechanically aligning relatively large beam cross sections rather than small fiber ends as is done in strictly mechanical or butt-type connectors. With such connectors, however, the burden on optical performance and related mechanical geometry is great and must be maintained to a high degree of precision integrated into the connector to assure that the connector itself does not create high losses. As an example, the permissible angular tilt between the lens surfaces of such connectors must be maintained to tolerances on the order of tenths of a degree if losses are not to exceed 0.5 db. Other dimensional requirements demanding adherence to exacting tolerances include the axial locations of the focal point behind any lens surfaces and, as well, laterally with respect to the optical axis; the separation between the connector halves' lens surfaces; and the axial and lateral alignment of the lens surfaces. In addition to the exacting tolerances required on the axial separation between the connector lens surfaces, the separation itself is comparatively small, approximately twice the focal length divided by the refractive index, thus making it difficult to introduce beamsplitters between the connector halves for purposes of multiplexing and demultiplexing. Thus, the expanded beam type connector in its known form is relatively difficult to manufacture and use in fiber optic communication networks for certain purposes. Consequently, it is a primary object of the present invention to provide an improved imaging type optical fiber connector.

It is another object of the present invention to provide an imaging type connector with relatively less demanding manufacturing tolerances.

It is yet another object of the present invention to provide an imaging type fiber optic connector having increased separation between its lens surfaces compared to known connectors.

Another object of the present invention is to provide a fiber optic multiplexer/demultiplexer.

Another object of the present invention is to provide an imaging type connector whose throughput is more tolerant of variations in certain parameters of optical fibers which it connects.

Other objects of the invention will, in part, be obvious and will, in part, appear hereinafter. The invention, accordingly comprises the apparatus possessing the construction, combination of elements, and arrangement of parts exemplified in the detailed disclosure which follows.

SUMMARY OF THE INVENTION

This invention in general relates to fiber optic communications systems and in particular to the structure of components for coupling two or more optical fibers which individually can carry information signals in the form of one or more modulated electromganetic waves of preassigned wavelength. In addition, the component may be used in arrangements with other components of similar structure and function to perform multiplexing/demultiplexing functions.

The component of the invention is of the imaging type and is molded of a transparent optical plastic to provide it with a unitary construction. It is adapted for use with a companion, preferably similar, component for purposes of optically coupling optical fibers with one another. The component itself includes a convex lens surface that is rotationally symmetric about an optical axis therethrough; at least one reference surface adapted for facilitating mounting and positioning the component; and means for facilitating positioning and holding the end of an optical fiber having a given numerical aperture and diameter along the optical axis of the component at a predetermined distance, behind the lens surface, which is different from the distance at which the lens surface focuses.

The component has a pupil which is the image substantially defined by the angular limitation of the light carried by the fiber mounted with the second lens component when the fiber end is positioned at its predetermined distance behind the lens surface. The lens surface is structured and the predetermined distance is selected so that the end of an optical fiber located at the predetermined distance is exactly imaged over or within the pupil of another such component aligned coaxially with the first component and axially spaced therefrom by a preselected distance substantially greater than the focal length of the component lens surface. Also, the component of the invention is designed in such a way that it may be used with a plurality of other components in multiplexing/demultiplexing arrangements so long as the optical path length between the various lens surfaces of the components is maintained as a constant. When used in this way as a group of components or simply as a path for coupling, the components are separated at their required distances through the use of a precision space which may also have incorporated therein other optical components such as beamsplitters to facilitate the performance of the multiplexing/demultiplexing functions.

Although it is preferable that the component of the invention be used with other like components in symmetrical arrangements, it is also possible to utilize components of dissimiliar design for the purposes outlined above if the fibers associated with each component are used at appropriate finite conjugates and each component images the fiber end involved into the pupil of the other component with which it is optically paired.

DESCRIPTION OF THE DRAWINGS

The novel features that are considered characteristic of this invention are set forth with particularity in the appended claims. The invention itself, however, both as to its organization and method of operation, together with other objects and advantages thereof, will best be understood from the following detailed description of the illustrated embodiments when read in connection with the accompanying drawings wherein like numbers have been employed in the different figures to denote the same parts and wherein:

DETAILED DESCRIPTION

This invention in general relates to fiber optic communications systems and in particular to the structure of components by which two or more optical fibers, which individually can carry information signals in the form of one or more modulated electromagnetic waves of preassigned wavelength, can be used for purely coupling purposes or for more complex purposes such as multiplexing and demultiplexing.

To understand the nature of the features of the invention, its method of use, and advantages over those components now known to the prior art, it will first be necessary to become familiar to some detail with the general characteristics of expanded-beam type connectors known in the prior art.

Figure 1:
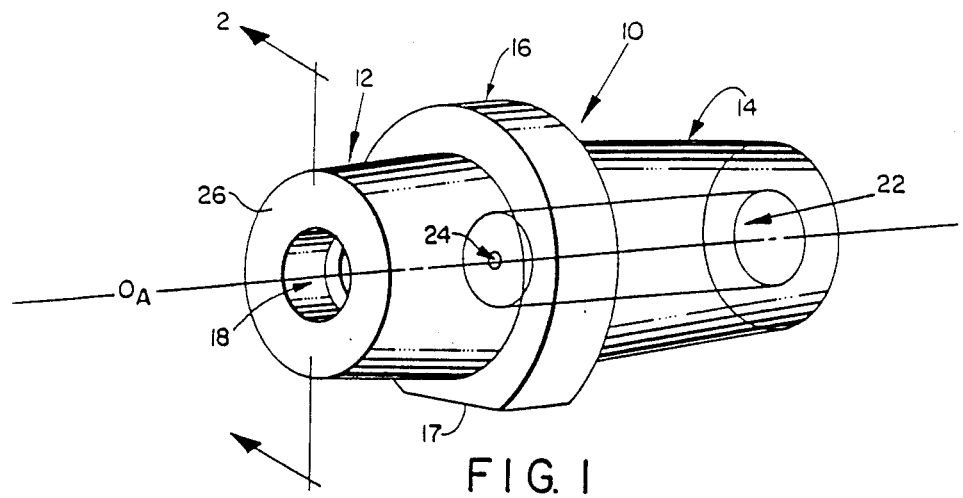
FIG. 1 is a diagrammatic perspective view of a well-known expanded-beam type lens structure or optical component useful in connecting optical fibers.
Figure 2:
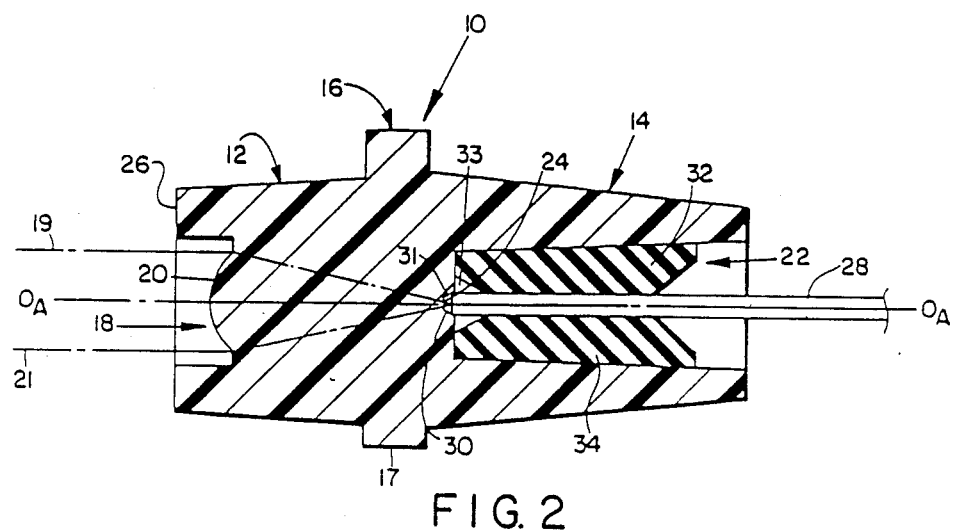
FIG. 2 is a slightly enlarged cross-sectional view of the optical component of FIG. 1, taken generally along line 2—2 in FIG. 1, and shown in combination with a segment of an optical fiber and holder arrangement therefore.

For these purposes, reference in now made to FIG. 1 which shows, designated at 10, a lens structure or optical component which is of the beam expansion type and which includes features representative of this class of device. The optical component 10, as can be seen in FIGS. 1 and 2, is an integrally formed structure, preferably molded of optical quality plastic. The optical component 10 comprises a front tapered section 12 and a rear tapered section 14 which join at a flange 16 having a flat 17 located in its circumferential surface. In the front section 12, there is a cylindrical bore 18 having a base in the form of an aspheric lens surface 20. In the rear tapered section 14, there is a tapered bore 22 having a base 33 which includes a centrally located tapered indent 24. The taper of the bore 22 is shown in exaggerated fashion for clarity.

The tapered bore 22 is structured to receive three molded elastic fiber holders (only two shown) such as those designated at 32 and 34. The elastic fiber holders, 32 and 34, are injection molded from an elastomeric polymer and each has a triangular-shaped cross-section which longitudinally tapers and is especially configured so that, when three of the fiber holders are inserted into the tapered bore 22, they form between them, along the central axis of the bore 22, a small hole that tapers out at each end of the fiber holders, 32 and 34. The size of this hole is by design made to be slightly too small to accept an optical fiber without stretching.

Between the tapered bore base 33, containing the tapered indent 24, and the forward ends of the fiber holders, e.g., 32 and 34, there is formed a small cavity 31. An epoxy having the same index of refraction, or nearly so, as that of the plastic from which the optical component 10 is formed, is placed into this cavity 31 via the hole formed between the fiber holders, 32 and 34. Afterwards, an optical fiber such as that designated at 28 is inserted into the hole formed between the fiber holders, 32 and 34, until the end thereof, designated at 30, seats in the taper of the indent 24. Since the hole formed between the fiber holders, 32 and 34, is intentionally smaller than the outside diameter of the fiber 28, the walls of the fiber holders (32 and 34) are stretched by the optical fiber 28 and each exerts on the optical fiber 28 lateral restoring forces which are proportional to the amount of deformation experienced by the optical fiber holders 32 and 34. These forces balance against one another to center the optical fiber 28 along the optical axis, OA, of the optical component 10 because an elastomeric material under pressure behaves like fluid to uniformly distribute any forces exerted upon it. The longitudinal position of the optical fiber end 30, along the optical component optical axis, OA, is determined by the diameter of the bare fiber in combination with the geometry of the tapered sides of the indent 24.

The dimensions of the tapered indent 24 are chosen so that the forward progress of the optical fiber end 30 is terminated, because of interference with the walls of the indent 24, at the axial focus of the aspheric lens surface 20 whose shape, incidentally, is chosen to correct for spherical aberrations on-axis. The presence of the index matching epoxy in the cavity 31 reduces unwanted reflections at the optical fiber end 30, and any light travelling from the lens surface 20 to the optical fiber end 30 experiences no additional refraction since the index of refraction everywhere along its path of travel is constant, or nearly so. Thus, a pair of parallel rays, such as those designated at 19 and 21, impinging upon the aspheric surface 20 are focused thereby into the optical fiber end 30, as best shown in FIG. 2. Conversely, any light emerging from the optical fiber end 30 diverges after which it is collimated by the aspheric lens surface 20 and emerges therefrom as a parallel bundle. Another way of stating this is that the numerical aperture (N.A.) of a bundle of rays emerging from the optical fiber end 30 is reduced upon emergence from the aspheric lens surface 20.

Surrounding the optical component front section bore 18 is an annular flat reference surface 26 that is nominally perpendicular to the optical axis, OA, of the optical component 10. The permissible angular tilt of this reference surface 26 with respect to the optical axis is on the order of plus or minus 30 arc seconds. When a pair of optical components of this type are butted together against their annular reference surfaces with their aspheric lens surfaces facing one another (shown in FIG. 3 where the optical components are identical but are differentiated with primed numerals), the beam of light emerging from one fiber end 28', serving as input gradually diverges as shown, for example, in the lens structure 10' after which it is collimated or nearly collimated by the aspheric lens surface 20' thereof and is then received by the other half of the connector pair and thereafter focused by its lens surface 20 into the end of the optical fiber 28 located in that half of the connector. The lateral alignment between the optical axes of such a pair of connectors or components may be accomplished in a well-known manner by utilizing their exterior surfaces as lateral alignment reference surfaces since they are generally rotationally symmetric.

The optical fibers used with these types of optical components may be multimode or single mode and are capable of carrying information signals in the form of one or more modulated electromagnetic waves of preselected wavelength. Typically, lasers or laser diodes are used as sources because of their coherence properties.

Although other optical components of this general type may have slightly different features than the one presently illustrated, all such optical components operate in generally the same manner. That is, the output from one optical fiber end is collimated, or nearly collimated, by a lens surface thereof after which this beam is received by a mating optical component or mating lens structure and is focused thereby into the end of another optical fiber end to complete the connection of the two optical fibers. Reference surfaces are generally included in each lens structure or optical component so that they may be properly aligned longitudinally, laterally, and perpendicular to one another. These kind of lens structures have several advantages. Optical fibers are completely protected within the connection and any dust or scratches on the lens surfaces have far less of an effect on the large diameter beam than if on the fiber end surfaces themselves. Additionally, the highly enlarged beam diameter makes the lateral tolerances for the interface between two connectors easy to meet.

Figure 3:
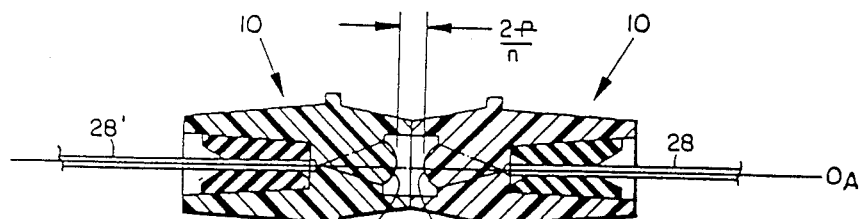
FIG. 3 is a cross-sectional view similar to that of FIG. 2, but at reduced scale, showing a pair of optical components of the type illustrated in FIG. 2 butted against one another to form a fiber optic connector.

However, not all of the tolerances are loose in this kind of design. For example, the optical fibers must be positioned relative to the respective lenses to the same sorts of accuracy that one would expect to have to achieve in butt-coupling the optical fibers themselves. And, the permissible angle of tilt between their reference surfaces and the optical axis, OA, or between the aspheric lens surfaces and the optical axis, OA, or between combinations of the tilt of the reference surfaces and the lens surfaces is actually tighter than for butting two fibers together. An example of the magnitude of loss which can occur with small angles of tilt is on the order of 0.5 db with a tilt angle error of only 0.1 degree of 6 minutes of arc. Consequently, it will be understood that it is necessary to fabricate such optical components to extremely accurate perpendicularity tolerances on their lens and reference surfaces. Angular tilt errors translate into aiming errors of the beams of light emerging from the aspheric lens surfaces, and these aiming errors ultimately account for the thoughput losses such as that indicated above. And even though the tighter tolerances demanded are limited to the one-time process of making the mold from which such optical components are fabricated, fabrication is still extremely difficult because of other factors related to the injection molding process. Therefore, there is a need to be able to manufacture such optical components to looser tolerances while still maintaining their other attractive features. In addition, even though there is a certain amount of space available between the lens surfaces of such optical components as illustrated in FIG. 3, it is desirable to be able to have such components separated by a much larger space to permit inserting into the intervening space more optical components than is presently possible with the prior art designs. This additional space can obviously facilitate the creation of taps or the performance of multiplexing tasks.

Optical components designed according to the principles of the present invention in some respects resemble those known in the prior art, but they also differ from the prior art in significant details which, have been discovered, provide important advantages over the prior art. These new components, which may be referred to as imaging components, can, as will be seen, be fabricated to relatively looser tolerances thereby easing their molding. And, they can also be separated by larger distances than before possible, and the tolerances on the separation distance itself are relatively looser thereby making their field use easier as well.

Rather than relying on collimation and operating at infinite conjugates as in the past, the components of the present invention operation at finite conjugates and each images the end of a fiber either in or onto the entrance pupil of another to accomplish the advantages discussed above.

Figure 4:
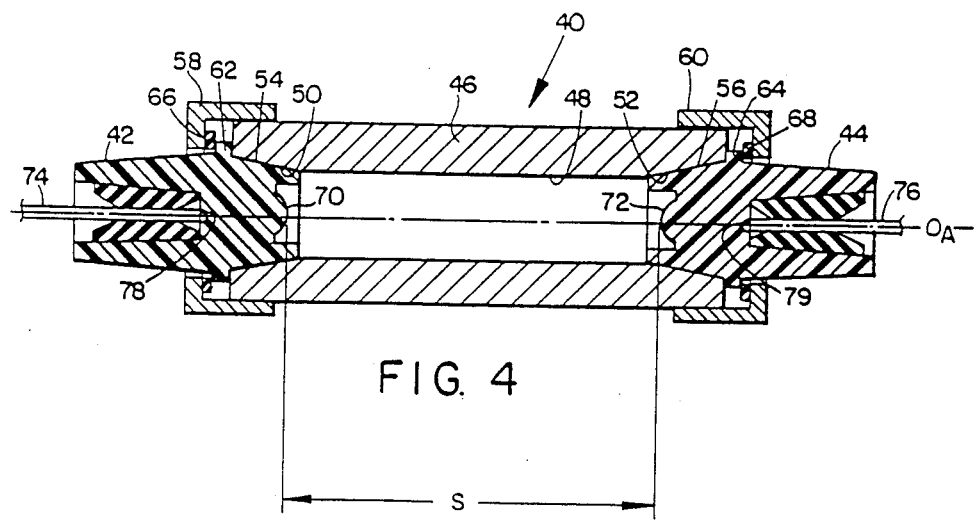
FIG. 4 is a cross-sectional view showing a pair of components structured according to the present invention together with a spacer.

A pair of such components, designed to operate at finite conjugates, are illustrated in one of their possible applications in FIG. 4 as part of a connector 40 suitable for use in optically bringing two fibers together. The components themselves are designated at 42 and 44 and are, through the use of a spacer 46, separated along the optical axis, OA, by a distance, S, measured between their lens surfaces. The distance, S, is calculated according to a procedure to follow.

The spacer 46 is rotationally symmetric about the optical axis, OA, and includes a central circular bore 48 which extends through a major portion of its overall length. At the ends of the central bore 48, there are tapered conical recesses, 50 and 52, respectively, each of which is adapted to receive the forward end of the optical components which are designated at 54 and 56, respectively. The conical shaped forward ends, 54 and 56, are shaped so that they precisely mate in a coaxial manner with the conical recesses 50 and 52 and, in this manner, the optical components 42 and 44 are concentrically aligned along the optical axis, OA. In addition, this arrangement assures that the sepration distance, S, is correct.

The optical components, 42 and 44, are held into their respective conical recesses, 50 and 52, by screw caps 58 and 60, respectively, which thread over the ends of the space 46 in a well-known manner. Between the screw caps, 58 and 60, and flanges, 62 and 64, respectively, of the components 42 and 44, are placed resilient rings, 66 and 68, respectively, which exert a pressure against the flanges, 62 and 64, to keep the components 42 and 44 seated in their respective conical recesses, 50 and 52.

Thus, the lens components 42 and 44 are provided with reference surfaces which permit them to be accurately aligned in position with respect to one another.

In addition, the optical components, 42 and 44 include lens surfaces, 70 and 72, respectively, which are designed in a manner to be subsequently described. Optical fibers 74 and 76, respectively, are placed within each of the lens components and are located therein in the manner described in connection with the description of the prior art components, or in other well-known manners, so that the ends of the optical fibers, 78 and 80 respectively, are located along the optical axis, OA, at a distance behind the lens surfaces, 70 and 72, which is different from the paraxial focus of the lens surfaces, 70 and 72. This is a significant departure from the prior art which placed the ends of the optical fibers exactly at the focus of the lens surfaces. By placing the ends of the optical fibers, 78 and 79, at a predetermined distance behind the lens surfaces, 70 and 72, different from their focus location, the end of each optical fiber, 78 and 80, is made to focus onto or within the entrance pupil of the corresponding lens component such that the throughput from one fiber to the other is maximized. The preferred design procedure for accomplishing this involves a series of calulations of the important parameters associated with the lens component, and this procedure is best illustrated in connection with the illustration of FIG. 5 and the following explanation.

Figure 5:
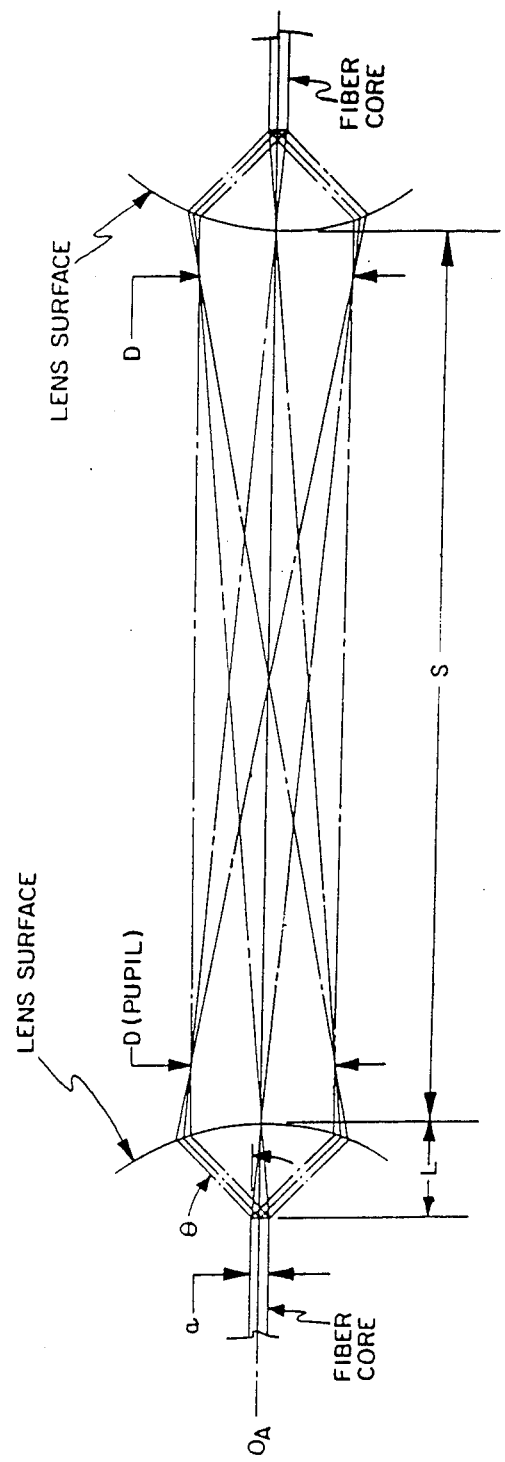
FIG. 5 is a diagrammatic drawing illustrating various parameters useful in designing the invention.

Referring now to FIG. 5, there are shown certain important parameters which are to be used in connection with the invention. The first important parameter is the length, L, which is the distance from the apex of the lens surface of the component to the end of the optical fiber. The distance, S, is the axial distance between the apex of one lens surface to the location of the other lens surface. The pupil is the image defined by the angular limitation of the light carried by the fiber mounted with the second lens component. Theta, $\theta$, is an angle whose sine is equal to the numerical aperture NA of the fiber divided by the index of refraction, n, of the material from which the optical components are fabricated. The distance, D, is the diameter of the pupil of the opposite lens component and is approximately equal to:

$$D \doteq 2L \sin \theta = \frac{2L \times NA}{n}.$$

The design procedure is as follows: first, one chooses the length, L. From here, the value of $\theta$ is calculated using the expression:

$$\sin \theta = \frac{NA}{n}.$$

Afterwards the value of D is determined from the expression previously given. The distance S is then calculated from the expression:

$$S = \frac{(DL)}{(an)} + \frac{L}{n} = \frac{2L^2 \times NA}{an^2} + \frac{2L}{n}.$$

Once all of these caluclations have been made to establish the overall distances involved with a pair of spaced apart lens components, an asphere in the form of a Cartesian ovoid is generated in a well-known manner to image one of the fiber cores upon the lens pupil, D. This asphere may be further optimized as a more generalized asphere if desired to slightly enhance the overall efficiency between the two lens components.

Light from an infinite distance incident upon the lens surface will not image upon the fiber end at distance L, but will image closer to the lens surface by the small distance $L^2/nS$.

As an example, let us take $L = 3.85$ mm and use a fiber with an NA of 0.21 and $a = 0.050$ mm, and fabricate the lens components from an optical plastic having an index of refraction, $n = 1.4853$. With these scales, the sine of $\theta$ is equal to 0.1414, and D is equal to 1.09 mm. This gives a separation distance, S, between the lens surfaces of about 59 mm. For this value of S, the separation between the lens surfaces is more than 15 times as large as the distance L. Parallel light would focus 0.169 mm away from the fiber, if it were present.

For a corresponding prior art design with a focal length of 3.85 mm, the optimum distance S would be equal to 5.18 mm, or only 1.35 times the focal length. Consequently, it can be seen that enormous improvements in overall separation are possible through the use of the lens components of the present invention. One important consequence of this is the provision of additional intervening space which is now available for other components which can perform more complex tasks than that of simply pure optical connection.

In addition, other advantages are achieved and these may best be understood by examining the throughput as a function of the distance between the focus of the lens surfaces and the ends of the fibers and the spacing between the lens surfaces of each component. This requires an analysis which may be made according to well-known exact ray tracing techniques followed by an accounting of the number of rays emanating from one optical fiber and entering the end of the other optical fiber given the particular details chosen for the two lens components involved.

Figure 6:
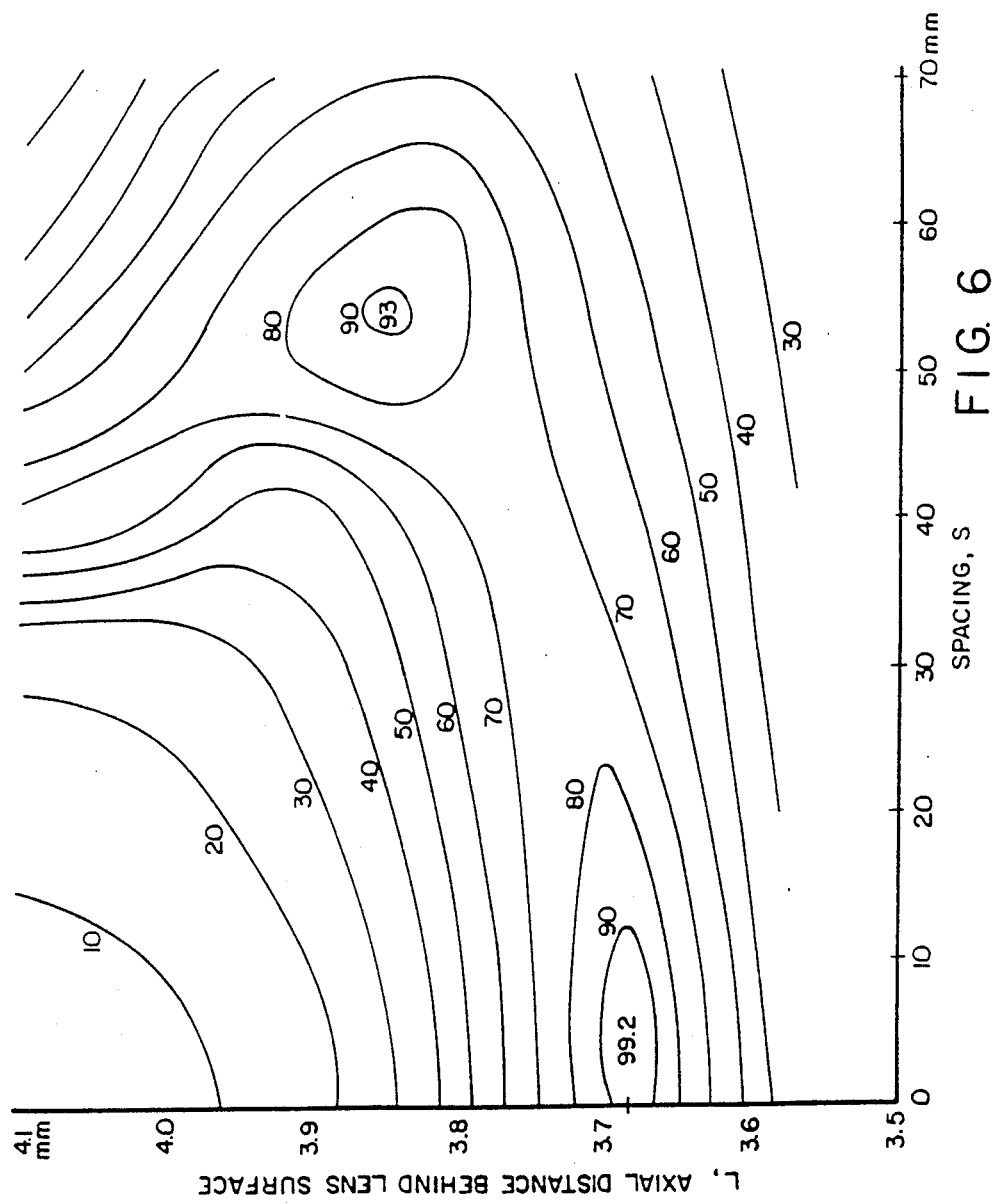
FIG. 6 is a graph showing the variation in optical throughput between components according to the invention as a function of the spacing between their optical lens surfaces and the position of a fiber with respect to the focus of the lens surface.

Such an analysis was performed and is shown in FIG. 6 for a typical set of spaced apart lens components according to the present invention. The aspheric surfaces are unchanging. The contour lines represent the percentage of light entering the second optical (step index) fiber after it has emerged from the first and gone through the two lens surfaces with the spacings and focus settings indicated. As can be seen, where the components are spaced closely together and the end of the optical fiber is placed at the focus of the component, which in this example, is slightly less than 3.7 mm, the efficiency is very high—99.2%. However, there exists another distinct region where the efficiency is also extremely high and in that region the spacing is much larger and the optical fiber end is now spaced away from the focus of each component. This second region of high efficiency is shown up and to the right of the first region, and the optimum spacing derived by the analysis is S=54 mm. Here, the efficiency region is wider in both spacing and focus. This clearly implies that there is less sensitivity to errors in the spacing and focus dimensions. Therefore, the lens components do not need to be fabricated to quite the same close tolerances which are required where the optical fiber needs to be placed exactly at the focus of a lens surface. In addition, there is more leniency in maintaining the spacing between the lens surfaces as can be clearly seen from this chart.

Figure 7:
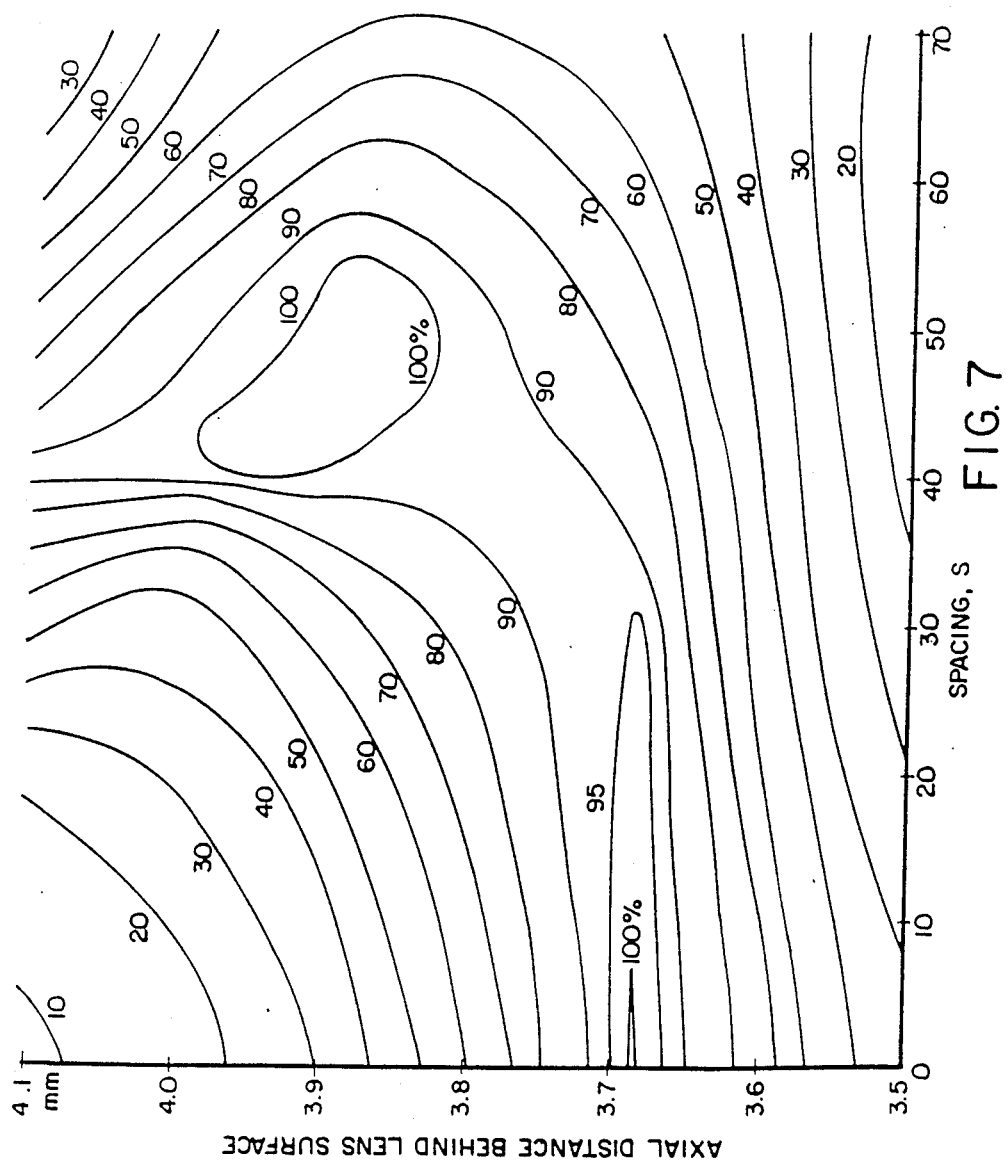
FIG. 7 is a graph similar to FIG. 6 except that the throughput illustrated is for optical fiber with a smaller numerical aperture than that used to generate the graph of FIG. 6.

FIG. 7 shows the effect on the contour plot of FIG. 6 of a reduction in the numerical aperture, NA, of the input fiber. It is clear from this chart, which was generated utilizing the same dimensions for the lens components as those of FIG. 6, that a reduction in the numerical aperture of the input fiber increases the throughput while at the same time leaving the focused fiber arrangement depending on accuracy of focusing, while the unfocused fiber operating at finite conjugate now has a region of extremely high efficiency while also having the benefits of not having to be manufactured to close tolerances nor mounted with a great deal of regard for the accuracy of the spacing between the components.

In the foregoing manner, the component of the invention has been shown to be of the imaging type and is preferably molded in a well-known manner of a suitable transparent optical plastic to provide it with a unitary construction. It is adapted for use with a companion, preferably similar, component for purposes of optically coupling optical fibers with one another. The component itself includes a convex lens surface that is rotationally symmetric about an optical axis therethrough; at least one reference surface adapted for facilitating mounting and positioning of the component; and means for facilitating positioning and holding the end of an optical fiber having a given numerical aperture and diameter along the optical axis of the component and at a predetermined distance, behind the lens surface, which is different from the distance at which the lens surface focuses.

The component has a lens pupil which is substantially defined by the image of the limiting angular extent of the light carried by the fiber when the fiber end is positioned at its predetermined distance behind the lens surface. The lens surface is structured and the predetermined distances are selected by a preferred method so that the end of an optical fiber located at the predetermined distance is exactly imaged onto the pupil of another such component aligned coaxially with the first component and axially spaced therefrom by a predetermined distance which is substantially greater than the focal length of the component lens surface.

Figure 8:
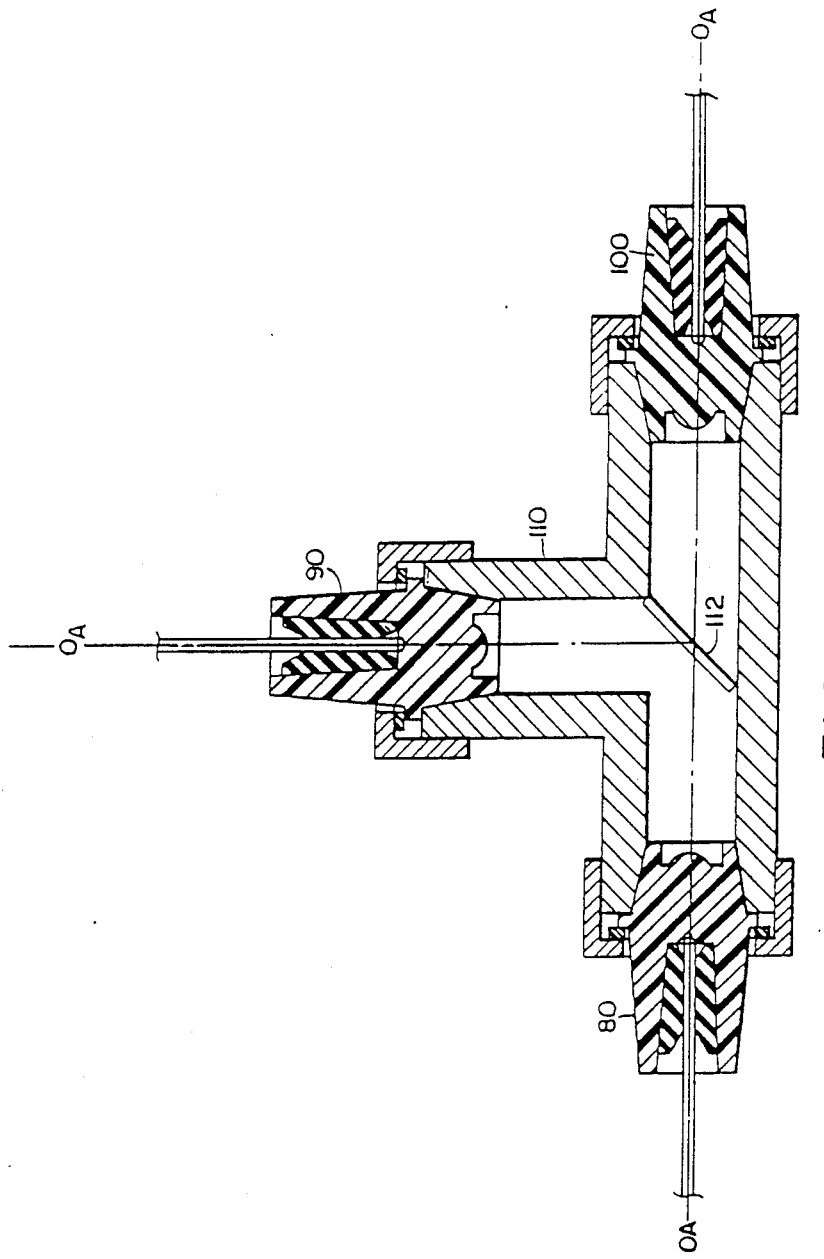
FIG. 8 is a cross-sectional view illustrating three components of the invention in an arrangement suitable for multiplexing/demultiplexing.

The component of the invention is designed in such a way that it may also be used with a plurality of other components in multiplexing/demultiplexing arrangements so long as the optical path length between the various lens surfaces of the components used in this manner is maintained as a constant. For an example of such an arrangement, reference is now made to FIG. 8 which shows three components, say, 80, 90 and 100. These components, 80, 90 and 100, are identical to those previously described, or are designed in a manner consistent with the procedure outlined above. The three components, 80, 90 and 100 are maintained in the manner shown by a spacer 110 constructed in a manner previously described. The spacer 110 includes therein an optical beamsplitter 112 positioned at 45° along the optical axis, $OA_1$, so that light emerging from the optical component 80 and passing through the beamsplitter 112 is imaged into the optical component 100. Light reflected from the beamsplitter 112 is imaged directly into the optical fiber of the lens component 90. In this connection, the spacing between the lens surfaces of all of the optical components shown here is a constant. That is, the optical path length between the lens surfaces of each of the components shown is identical. In this manner, signals can be interchanged between the three components, 80, 90 and 100 to perform a variety of tasks important in optical fiber communications systems. The beamsplitter 112 may also be made dichroic for multiplexing and demultiplexing between the components with component 80 acting as the trunk.

Figure 9:
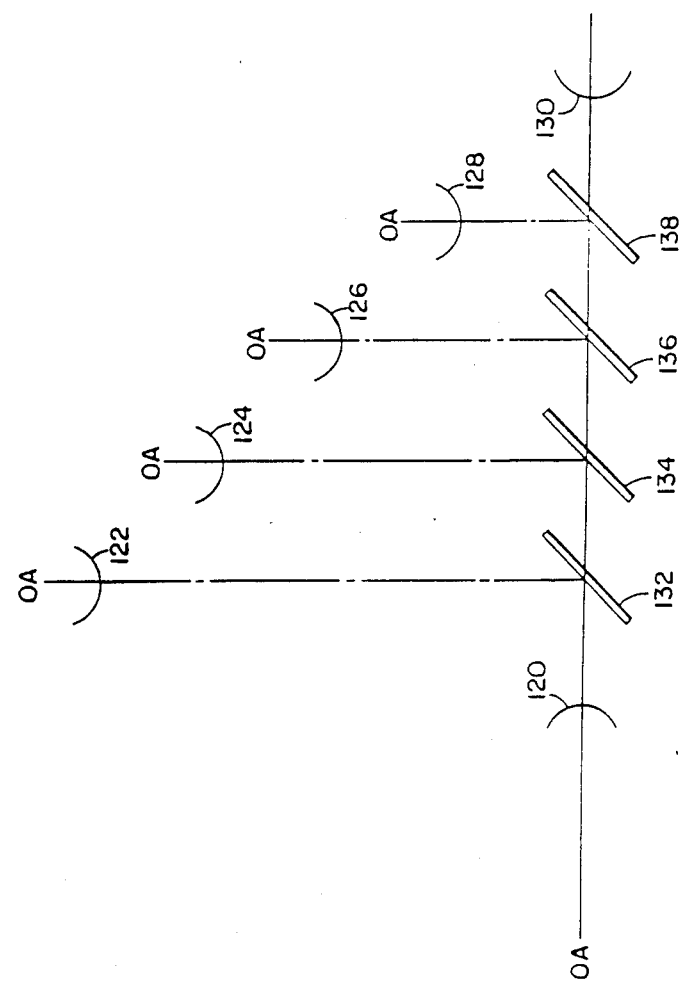
FIG. 9 is a diagrammatic illustration indicating how one would use a plurality of the components of the invention to multiplex/demultiplex between a plurality of fibers.

More than three components can be utilized, and this may be done in a more complex arrangement which is shown in FIG. 9 where six lens surfaces are shown schematically and are designated at 120, 122, 124, 126, 128 and 130. All of the lens surfaces here are arranged along respective optical axes, the OA's, which are folded at 90 degrees to one another, and the optical path length between corresponding lens surfaces, along their respective optical axis, is made to be equal to the distance, S, previously defined. Folding the optical paths is accomplished with beamsplitters designated at 132, 134, 136 and 138. All of the components may be mounted in a manner previously described, and the design of such an arrangement would be within the skill of one familiar with the arts involved. This last arrangement obviously would also be suitable for performing multiplexing and demultiplexing tasks in a more complicated optical fiber communication system with the beamsplitters, 132-138, made dichroic so that each optical path becomes wavelength selective.

As required, devices other than beamsplitters can be placed in the intervening space between the lens components. As an example, use may be made of optically active crystalline cells or systems or lenses. All that is required is to account for the change in optical path length due to the index and geometry of the component to be used and in those cases where lenses are introduced to assume that the fibers are still imaged as taught herein.

When used in this way as a group of components or simply as a path for coupling, the components of the invention are separated at the required distances through the use of a precision spacing sleeve in both applications and may also have incorporated therein other optical components such as beamsplitters to facilitate the performance of multiplexing/demultiplexing functions. Although it is preferable that the components of the invention be used with other like components in symmetrical arrangements, it is also possible to utilize components of dissimilar design for the purposes outlined above if the fibers associatd with each component are used at appropriate finite conjugates and each component images the fiber end into the clear aperture of the other component with which it is utilized. This may be accomplished in a well-known manner to those having ordinary skill in the optical design arts.

The availability of the increased intervening space between the lens components of the invention over that of the prior art is directly attributable to the unexpected presence of the second high throughput region where the lens components can be spaced apart by distances formerly unknown in the art.

It will be obvious to those skilled in the art that other changes may be made in the above-described embodiments without departing from the scope of the invention. Therefore, it is intended that all matter contained in the above description or shown in the accompanying drawings shall be interpreted as illustrative and not in a limiting sense.

What is claimed is:

1. A component for use in arrangements with other similar components to optically mate the free ends of optical fibers, said component comprising a unitary piece of transparent optical plastic having integrally molded therein portions defining a convex lens surface that is rotationally symmetric about an optical axis and has a predetermined axial focus point, said component having other portions which define at least one reference surface that is adapted for facilitating mounting the free end of one optical fiber at a point along said optical axis other than said axial focus point, said convex lens surface being operative when the end of said one fiber is located at said other point, to both form an image of said one fiber end and provide, in conjunction with such one fiber's numerical aperture, a component pupil both of which are located finite, but different axial distances, ahead of said convex lens surface, said component thus structured being adapted for use with other components having similar properties which permit them to be used in pairs or groups where they are spaced apart so that the image which each forms of an associated fiber end is on or within the pupil of another whereby light emerging from either fiber end is transferred into the end of the other fiber substantially without loss while permitting said components to be molded with constricted tolerances more relaxed than otherwise possible.

2. The component of claim 1 wherein said convex lens surface is aspheric in shape.

3. The component of claim 2 wherein said aspheric shape is a Cartesian ovoid.

4. The component of claim 1 wherein said reference surface is rotationally symmetric with respect to said optical axis.

5. The component of claim 4 wherein said reference surface is conically shaped.

6. A connector for use in optically mating the free ends of optical fibers, said connector comprising:

a first component comprising a unitary piece of transparent optical plastic having integrally molded therein portions defining a convex lens surface that is rotationally symmetric about an optical axis and has a predetermined axial focus point, said first component having other portions which define at least one reference surface that is adapted for facilitating mounting the free end of one optical fiber at a point along said optical axis other than said axial focus point, said convex lens surface being operative, when the end of said one fiber is located at said other point, to both form an image of said one fiber end and provide, in conjunction with such one fiber's numerical aperture, a component pupil both of which are located at finite, but different axial distances, ahead of said convex lens surface; and a second component spaced from said first component along an optical path beyond the location where said first component image is formed, said second component also comprising a unitary piece of transparent optical plastic having integrally formed therein portions defining a convex lens surface that is rotationally symmetric about said optical axis, faces said first component convex lens surface, and has a predetermined axial focus point, said second component also having other portions which define at least one reference surface adapted for facilitating mounting the free end of another optical fiber behind said second component convex lens surface at a point along said optical axis other than said second component axial focus point, said second component convex lens surface being operative, when the end of said other fiber is located at said other point, to both image said other fiber end on or within said pupil of said first component and provide, in conjunction with such other fiber's numerical aperture, said second component with a pupil at the axial location of said image of said one fiber end and large enough to encompass said one fiber end image whereby light emerging from either fiber end is transferred into the end of the other fiber substantially without loss while permitting said components to be molded with constricted tolerances more relaxed than otherwise possible.

7. The connector of claim 6 wherein there are at least three of said components including one master component with all of said other components separated from said master component by said preselected optical path length.

8. The connector of claim 7 wherein said optical path length includes a reflective means located between selected ones of said components forming a folded optical path.

9. The connector of claim 8 wherein said folded optical paths are folded through 90 degrees.

10. The connector of claim 9 wherein said reflective means is a wavelength selective beamsplitter so that said connector can be used for multiplexing/demultiplexing.

11. The component of claim 6 wherein said convex lens surface is aspheric in shape.

12. The component of claim 11 wherein said aspheric shape is a Cartesian ovoid.

13. The component of claim 11 wherein said reference surface is rotationally symmetric with respect to said optical axis.

14. The component of claim 13 wherein said reference surface is conically shaped.

* * * * *